US010494519B2

(12) United States Patent
Wilson et al.

(10) Patent No.: US 10,494,519 B2
(45) Date of Patent: Dec. 3, 2019

(54) CPE BASED WELDING HOSE

(71) Applicant: ContiTech USA, Inc., Fairlawn, OH (US)

(72) Inventors: Flint Wilson, Mt. Pleasant, IA (US); Jeffrey P. Dotson, Riverside, IA (US); Jeffrey T. Epperson, Mount Pleasant, IA (US)

(73) Assignee: ContiTech USA, Inc., Fairlawn, OH (US)

( * ) Notice: Subject to any disclaimer, the term of this patent is extended or adjusted under 35 U.S.C. 154(b) by 256 days.

(21) Appl. No.: 15/815,785

(22) Filed: Nov. 17, 2017

(65) Prior Publication Data

US 2019/0153207 A1    May 23, 2019

(51) Int. Cl.
| | |
|---|---|
| C08L 23/28 | (2006.01) |
| C08K 3/02 | (2006.01) |
| C08K 5/14 | (2006.01) |
| C08L 23/16 | (2006.01) |
| F16L 11/08 | (2006.01) |
| F16L 11/12 | (2006.01) |

(52) U.S. Cl.
CPC ............. *C08L 23/286* (2013.01); *C08K 3/02* (2013.01); *C08K 5/14* (2013.01); *C08L 23/16* (2013.01); *F16L 11/08* (2013.01); *F16L 11/12* (2013.01); *C08L 2201/02* (2013.01); *C08L 2205/02* (2013.01)

(58) Field of Classification Search
CPC ............... C08L 23/286; C08L 2201/02; C08L 2205/05; C08L 23/16; C08K 3/02; C08K 5/14; F16L 11/08; F16L 11/12
See application file for complete search history.

(56) References Cited

U.S. PATENT DOCUMENTS

| | | |
|---|---|---|
| 6,656,552 B1 | 12/2003 | Crouse |
| 2009/0211660 A1 | 8/2009 | Johnson |
| 2012/0090720 A1 | 4/2012 | Burrowes et al. |

FOREIGN PATENT DOCUMENTS

EP    0999394 A1    5/2000

OTHER PUBLICATIONS

International Search Report dated Feb. 13, 2019 of international application PCT/US2018/059124 on which this application is based.

*Primary Examiner* — Michael C Miggins
(74) *Attorney, Agent, or Firm* — David L. Cate; Gregory Adams

(57) ABSTRACT

A hose includes an inner tube containing a blend of chlorinated polyethylene (CPE) with ethylene propylene diene monomer rubber (EPDM), from 5 phr to 15 phr of a branched plasticizer, from 10 phr to 30 phr carbon black, from 30 phr to 60 phr mineral filling, and a peroxide curing agent. The hose defines an inner conduit. A reinforcement layer is disposed outwardly adjacent the inner tube, and an outer cover disposed outwardly adjacent the reinforcement layer. Upon and after curing, the inner tube at least meets methyl borate resistance, acetone resistance and pentane resistance requirements of Australian Standard AS1335. In some aspects, after curing the inner tube exceeds the methyl borate resistance, acetone resistance and pentane resistance requirements of the Australian Standard AS1335. Also, after curing, the hose at least meets flame resistance requirements of the Australian Standard AS1335.

21 Claims, 3 Drawing Sheets

CPE BASED WELDING HOSE

FIELD

The field to which the disclosure generally relates to rubber compositions, and specifically to rubber compositions useful for providing hose or other rubber based articles having excellent chemical resistance properties.

BACKGROUND

This section provides background information to facilitate a better understanding of the various aspects of the disclosure. It should be understood that the statements in this section of this document are to be read in this light, and not as admissions of prior art.

Welding and cutting equipment typically utilizes hoses for making connections between a torch and regulators. The hoses must be strong, nonporous, light, and flexible enough to make torch movements easy. The hoses are typically made to withstand internal pressures that can reach as high as 174 psi.

Such hoses are typically available in single- and double-hose lengths. Size is determined by the inside diameter, and the proper size depends on the type of work for which it is intended. Hose used for light work has a 3/16 or 1/4 inch inside diameter and one or two plies of fabric. For heavy-duty welding and cutting operations, use a hose with an inside diameter of 5/16 inch and two to four plies of fabric. Single hose is available in the standard sizes as well as 1/2 and 3/4 inch sizes. These larger sizes are for heavy-duty heating and for use on large cutting machines.

The most common type of cutting and welding hose is the twin or double hose that consists of a fuel hose and an oxygen hose joined together side by side. They may be joined together by either a special rib or by clamps. Because the hoses are joined together, the hoses are less likely to become tangled and are easier to move from a first place to a second place.

The length of hose may also be important. The delivery pressure at the torch varies with the length of the hose. A 20-foot, 3/16-inch hose maybe adequate for a job, but if the same hose was 50 feet long, the pressure drop would result in insufficient gas flow to the torch. Longer hoses require larger inside diameters to ensure the correct flow of gas to the torch. The hoses used for fuel gas and oxygen are often, but no always, identical in construction, but they differ in color. This color coding aids in the prevention of mishaps that could lead to dangerous accidents.

The conventional hoses are nitrile rubber (NBR)/styrene-butadiene rubber (SBR) based hoses that are often insufficient in chemical resistance, and thus unable to fulfill the requirements of some testing standards. One such standard is the Australian Standard AS1335 for hose and hose assemblies for welding, cutting and allied processes. This standard sets out requirements for hose and hose assemblies for use in the welding, cutting and allied processes. The hose and hose assemblies have a minimum rated working pressure of 1.2 MPa for containing and conveying acetylene, oxygen, liquefied petroleum gases (LPGs) and mixtures of methylacetylene and propadiene (MPS), nitrogen and other non-combustible inert shielding gases such as argon and carbon dioxide. The standard requires the hoses to pass rigorous exposure to chemicals, such as methyl borate, acetone and pentane.

Thus, there exists a need for combinations of materials which form articles, such as welding and cutting equipment hoses which have sufficient chemical resistance required by certain standards, such need met at least in part, with the following disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments of the disclosure, a hose is provided which includes an inner tube containing a blend of chlorinated polyethylene (CPE) with ethylene propylene diene monomer rubber (EPDM), from 5 phr to 15 phr of a branched plasticizer, from 10 phr to 30 phr carbon black, from 30 phr to 60 phr mineral filling, and a peroxide curing agent. The hose defines an inner conduit. A reinforcement layer is disposed outwardly adjacent the inner tube, and an outer cover disposed outwardly adjacent the reinforcement layer. Upon and after curing, the inner tube at least meets methyl borate resistance, acetone resistance and pentane resistance requirements of Australian Standard AS1335. In some aspects, after curing the inner tube exceeds the methyl borate resistance, acetone resistance and pentane resistance requirements of the Australian Standard AS1335. Also, after curing, the hose at least meets flame resistance requirements of the Australian Standard AS1335. Additionally, in some embodiments, some hoses meet all aspects of the Australian Standard AS1335.

The cured hose may contain at least one of acetylene, oxygen, liquefied petroleum gases (LPGs), or mixtures of methylacetylene and propadiene (MPS), within the inner conduit. In some aspects, the hose conveys at least one of acetylene, oxygen, liquefied petroleum gases (LPGs), or mixtures of methylacetylene and propadiene (MPS), through the inner conduit.

In some aspects, the blended amount of chlorinated polyethylene (CPE) with EPDM may be in a weight ratio of from 5:1 to 20:1, or even in a weight ratio of from 10:1 to 15:1.

In some aspects, the reinforcement layer includes a plurality of spiral yarns. Also, the outer cover may include EPDM and/or CPE/EPDM blend.

In another aspect of the disclosure, a welding hose assembly includes first and second hoses and couplings securely attached to opposing distal ends of each of the first and second hoses. The first hose includes an inner tube having a blend of chlorinated polyethylene (CPE) with ethylene propylene diene monomer rubber (EPDM), from 5 phr to 15 phr branched plasticizer, from 10 phr to 30 phr carbon black, from 30 phr to 60 phr mineral filling, and a peroxide curing agent, wherein the hose defines an inner conduit. A reinforcement layer disposed outwardly adjacent the inner tube, and an outer cover disposed outwardly adjacent the reinforcement layer. Upon and after curing, the inner tube at least meets methyl borate resistance, acetone resistance and pentane resistance requirements of Australian Standard AS1335. In some aspects, the first and second hoses have inner tubes constructed of the same composition, while in some other aspects, the second hose includes an inner tube constructed of an EPDM material.

The welding hose assembly may have the first and second hoses attached by a joint formed from the outer cover of the first hose and an outer cover of the second hose. In some cases, the joint is cohesive and formed during the hose curing process. Alternatively, the joint is formed during by applying an adhesive to the outer cover of the first hose and the outer cover of the second hose. Additionally, the first and second hoses may be further attached by a clamp. In yet other cases, the first and second hoses are attached by mating corresponding tabs extending from the outer cover of the first hose and an outer cover of the second hose.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
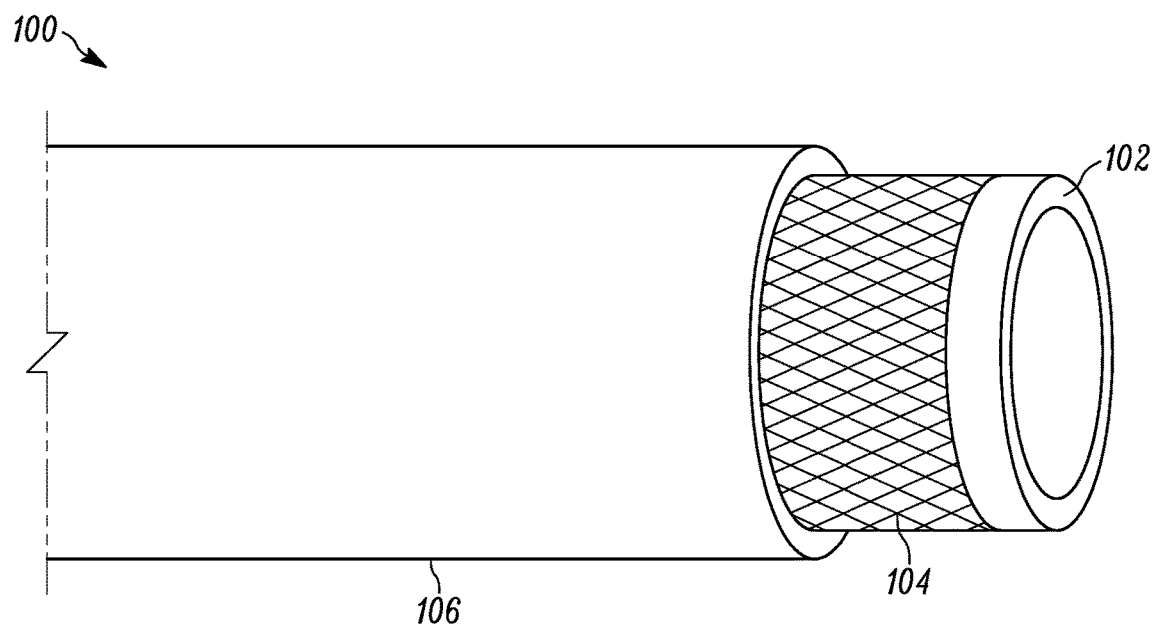
FIG. 1 illustrates in a perspective view, a portion of a hose embodiment, according to an aspect of the disclosure.
Figure 2:
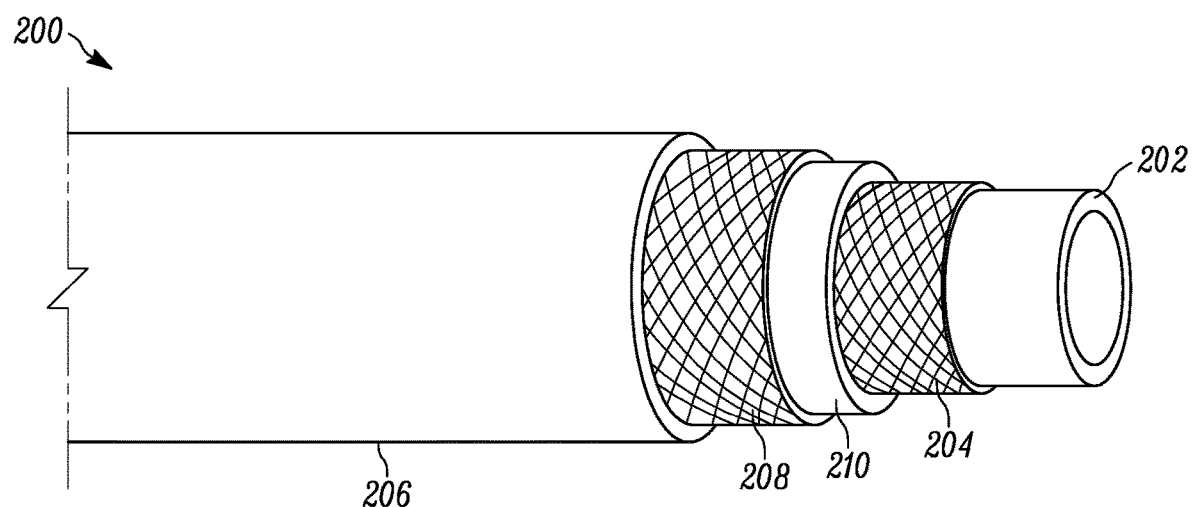
FIG. 2 depicts in a perspective view, a portion of another hose embodiment, according to another aspect of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the materials used in the present disclosure are described herein as comprising certain components, it should be understood that the materials could optionally comprise two or more chemically different materials. In addition, the materials can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value, concentration and/or amount range listed or described as being useful, suitable, or the like, is intended that any and every point within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosure are hoses useful for welding hose assemblies. Referring to FIG. 1, some hoses 100 according to the disclosure include, at a minimum, an inner tube 102, at least one reinforcement layer 104, and an outer cover 106. Hoses may be any type of welding equipment hose, such as a single line welding hose which may meet the AS-1335 standard. Hoses may be paired together or paired with other convention hoses to make a hose assembly which may be a twin-line welding grade hose assembly, which may meet AS-1335 requirements.

Some hose embodiments according to the disclosure include an inner tube based upon a blend of chlorinated polyethylene (CPE) with ethylene propylene diene monomer rubber (EPDM), which further includes from 10 phr to 25 phr branched plasticizer, from 30 phr to 50 phr carbon black, from 60 phr to 85 phr mineral filling, and a peroxide curing agent. The inner tube hose defines an inner conduit therein through which fluids may be contained and/or conveyed. In some alternate embodiments ethylene propylene rubber (EPR) is used in place of the EPDM.

The EPDM rubber useful in some embodiments of the disclosure is generally a terpolymer of ethylene, propylene, and diene functional monomers. In some aspects, the EPDM rubber from about 2.5% to about 12% weight of diene functional monomer, and in some other aspects, at least 6% by weight of diene functional monomer.

In some embodiments of the disclosure, the chlorinated polyethylene (CPE) is a variation of polyethylene having a chlorine content from about 34 to about 44% by weight. The chlorinated polyethylene can be crosslinked peroxidically with the EPDM, to form inner tube elastomer with properties described above, as well as improved flammability resistance.

Some nonlimiting examples of useful chlorinated polyethylene (CPE) materials according to the disclosure include commercially available materials, such as Weipren® 4136L, Weipren® 4235, Weipren® 6335, Weipren® 7130, and the like. Some nonlimiting examples of EPDM materials useful in some embodiments of the disclosure include those EPDM materials having a weight ratio of ethylene to propylene of from about 1:1 up to about 3:1, ethylidene norbornene diene content of from about 3% to 6% by weight, and a Mooney viscosity of from about 50 to about 75. Some nonlimiting commercially available examples include Royalene® 512, Royalene® 539, Royalene® 563, Vistalon® 5601, Vistalon® 6602, Nordel® 4640, Nordel® 4570, Nordel® 4770, and the like.

Conventional peroxide curing agents may be used in the compositions forming the inner tubes, according to the disclosure. The peroxide curing agent will typically be employed at a level which is within the range of about 0.2 phr to about 2.0 phr and will more typically be utilized at a level which is within the range of about 0.3 phr to about 1.5 phr. In some aspects, the peroxide curing agent is included at a level which is within the range of about 0.4 phr to about 0.8 phr.

The peroxide curing agents which can be utilized according to the disclosure are those which are generally suitable for curing EPDM. Some representative examples of organic peroxides which can be used include, but not limited to, dicumyl peroxide, t-butyl perbenzoate, di-t-butyl peroxide, 2,5-dimethyl-2,5-di-t-butylperoxyhexane, alpha-alpha'-bis(t-butylperoxy) diisopropylbenzene, methylethyl ketone peroxide, cyclohexanone peroxide, cumene hydroperoxide, pinane hydroperoxide, p-menthane hydroperoxide, t-butyl hydroperoxide, di-t-butyl peroxide, and the like. Dicumyl peroxide and alpha-alpha'-bis(t-butylperoxy) diisopropylbenzene are preferred peroxide compounds in some embodiments.

Embodiments according to the disclosure include at least one reinforcement layer disposed outwardly adjacent the inner tube. The reinforcement layer, or layers, may include one or more layers of textile fabric or single yarns, and optional tie layers when multiple textile layers are used. In some embodiments, no tie layers are used in the reinforcement layer, when multiple textile layers are used. The textile layers typically comprise yarns which are made of any suitable material, such as, but not limited to cotton, polyester, nylon, or blends thereof. Likewise, single yarns may be made of any suitable material, such as, but not limited to cotton, polyester, nylon, or blends thereof.

Yarns used in hose embodiments for reinforcement of the tube material provide the strength to achieve the desired resistance to internal pressure or to provide resistance to collapse, or both. The basic yarn properties required for hose reinforcement are: adequate strength, acceptable heat resistance, dynamic fatigue resistance, and satisfactory process ability for the various methods of reinforcing hose. Other special properties such as stiffness, adhesion, conductivity, etc., may be developed depending upon the specific hose application. Yarn is available in two basic forms: staple (sometimes referred to as spun yarn) and filament.

Staple yarn is made by twisting bundles of short fibers to form a continuous yarn. The staple obtains its strength from the binding effect of the twist imparted to the individual fibers. The base staple yarn is called a singles. It is made from fiber bundles twisted together in one direction to form a singles strand. If two or more single yarns are twisted together, usually in a direction opposite that of the singles yarn, the result is a plied yarn. Two or more plied yarns may be twisted to form a cable cord. The strength, elongation, and thickness of yarn are a function of the twist level and the number of fibers in the bundle. Staple yarns may be made from natural or synthetic fibers or a blend of the two. The cotton count system is normally used to designate staple yarn size. The number of "hanks" in one pound is the yarn number. A cotton hank is 840 yards. Therefore, a 2's staple yarn contains approximately 1680 yards in one pound. The cotton count system is an inverse measure of the linear density of the yarn, i.e., as the yarn number increases the yarn size is decreased.

Filament yarn is produced by extruding synthetic material through a spinnerette containing hundreds of orifices. The monofilaments from each of the orifices are brought together to form a multifilament yarn. Filament yarns have higher tenacity (strength per unit of weight—grams per denier), in the range of 2 to 3 times that of staple yarn on the same material type and size.

The properties of the textile fabric depend on the construction and the material from which the yarn is made and on the type of weave used. One common hose fabric is woven from warp yarns, which run lengthwise, and filling yarns, which run cross-wise. Usually they are woven at right angles to each other. The most common weave is known as "plain weave". Other weaves used, though to a lesser degree, are twill, basket weave, and leno. Woven cord is a special type of hose reinforcement which may be used. The warp cords are strong while the filling yarn is very fine and merely holds the cords in position. This is often called "tire cord" because this type of construction is commonly used in reinforcing tires. Woven cord provides strength in one direction only. When woven cord is used, a minimum of two layers are applied in alternate directions.

In some aspects, where a plurality of single yarns are used as the reinforcement layer, the yarns may be applied over the inner tube in counter spiraling orientations, as shown in FIG. 1, 104. These yarn may be woven in an over/under pattern, or simply a first set of yarns applied in a spiral direction laying beneath a second set of yarns applied in a counter spiral direction.

In some aspects of the disclosure, to adhere to the tube and cover of the hose, the fabric and/or yarns may be rubberized. The fabric and/or yarns is either frictioned or coated with a thin layer of rubber. Before rubberizing, some fabrics and/or yarns are treated with liquid adhesive. In some cases, fabrics and/or yarns may be used after treatment with liquid adhesive, and not necessarily rubberized.

Hose embodiments according to the disclosure include an outer cover disposed outwardly adjacent the reinforcement layer(s) described above. In general, the outer cover may be based upon any rubber that can be crosslinked. Mixtures of rubbers may also be used. Some examples of a rubber useful according to the disclosure, include, without limitation, vinyl-reinforced nitrile rubber or EPDM synthetic rubber. Other synthetic rubbers may be used, as well, in accordance with the disclosure. Examples include, without limitation, synthetic polyisoprenes, polybutadienes, acrylonitrile butadiene rubber, styrene acrylonitrile butadiene rubber, polychloroprene rubber, styrene-butadiene copolymer rubber, isoprene-isobutylene copolymer rubber and its halogenated derivatives, ethylenepropylene-diene copolymer rubbers such as ethylene-propylene-cyclopentadiene terpolymer, ethylene-propylene ethylidene norbornene terpolymer, and ethylene-propylene-1,4-hexadiene terpolymer, butadienepropylene copolymer rubber, butadiene-ethylene copolymer rubber, butadiene-isoprene copolymer, polypentenamer, styrene-butadiene-styrene block copolymers, epoxidized natural rubber and their mixtures. In general, such compounds are characterized by repeating olefinic unsaturation in the backbone of the polymer, which generally arises from the presence of butadiene or isoprene monomers in the polymer structure.

Fillers may be used in the compositions used to form the tube and cover layers, to enhance properties, to save money, to facilitate processing, to improve physical properties or for other reasons. A variety of filler materials are known. Such fillers include silica, carbon black, clay, organic fiber, inorganic metal powder, mineral powder, talc, calcium sulfate, calcium silicate, and the like. Typical levels of these and other fillers include from about 10 phr to 100 phr or higher. In various embodiments, the compositions contain 10-80, 30-70, 40-60, 50-60, or 35-60 phr filler. The compositions may also contain other ingredients in addition to the rubbers, distillates, curatives, and accelerators. These additives are well-known in the art and include activators, processing aids, antioxidant packages, pigments, and the like. Non-limiting examples of specific uses of these additives are given in the examples.

The compositions used to form the tube and cover layers according to the disclosure may be compounded in conventional rubber processing equipment. In a typical procedure, all components of the rubber composition are weighed out. The rubber and additives are then compounded in a conventional mixer such as a Banbury® mixer. If desired, the compounded rubber may then be further mixed on a roller mill. At this time, it is possible to add pigments such as carbon black. The composition may be allowed to mature for a period of hours prior to the addition of curative(s) and accelerators, or they may be added immediately on the roller mill. It has been found to be advantageous to add the accelerators into the Banbury® mixer in the later stages of the mixing cycle. Adding the accelerators into the Banbury® mixer generally improves their distribution in the rubber composition, and aids in the reduction of the cure time and temperatures that is observed in the compositions of the invention.

Now referencing FIGS. 2 through 6 which illustrate yet other hose and hose assembly embodiments according to the disclosure. Hose 200, depicted in FIG. 2, includes an inner tube 202, a first reinforcement layer 204, and an outer cover 206. Hose 200 further includes a second reinforcement layer 208 and an optional tie layer 210 disposed between, and optionally extending into, first reinforcement layer 204 and second reinforcement layer 208.

Figure 3:
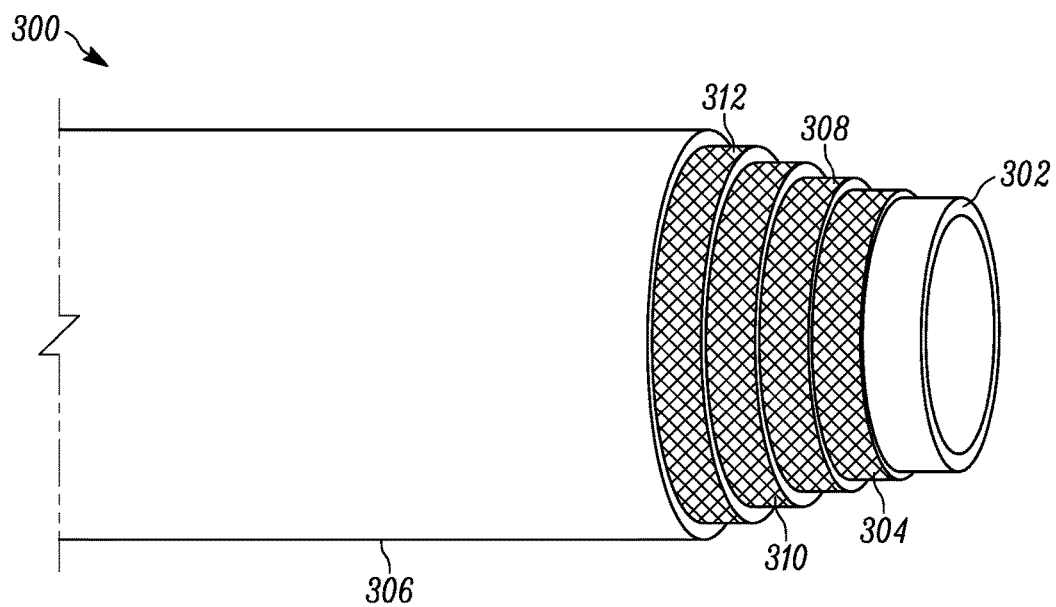
FIG. 3 shows in a perspective view, a portion of yet another hose embodiment, according to an aspect of the disclosure.

Hose 300, shown in FIG. 3, includes an inner tube 302, a first reinforcement layer 304, and an outer cover 306. Hose 300 further includes a second reinforcement layer 308, third reinforcement layer 310, and fourth reinforcement layer 312. Optional tie layers may be disposed between the reinforcement layers. Hose 300 may be useful for high pressure applications, such as a high pressure oxygen charge hose.

Figure 4:
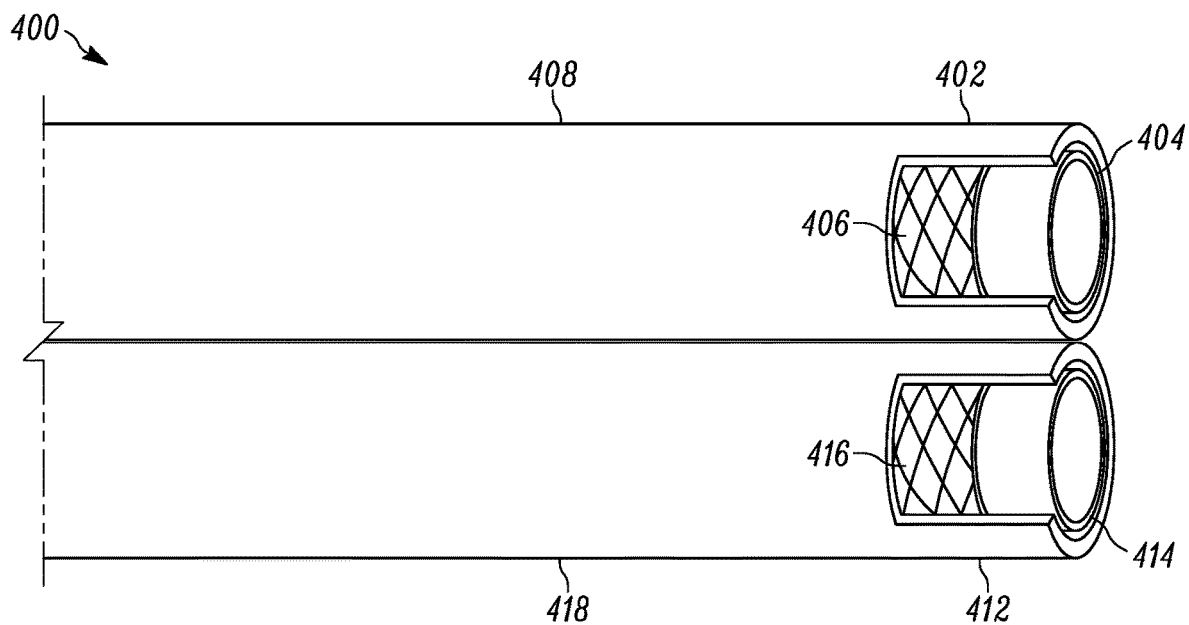
FIG. 4 illustrates in a perspective view, a portion of a hose assembly embodiment, according to an aspect of the disclosure.

Now referencing FIG. 4, which depicts a hose assembly according to the disclosure. Hose assembly includes a pair of hoses, 402 and 412, which are connected by any suitable means, such as, but not limited to, clips, clamps, adhered tabs, a common cover, covers which are co-cured to form connected covers, combinations thereof, and the like. Hoses 402 and 412 include inner tubes 404 and 414 respectively, reinforcement layers 406 and 416, and covers 408 and 418. Inner tubes 404 and 414, may, in some aspects, may both include a blend of chlorinated polyethylene (CPE) with ethylene propylene diene monomer rubber (EPDM), as described above. In some other aspects, only one of inner tubes 404 or 414 includes a blend of chlorinated polyethylene (CPE) with ethylene propylene diene monomer rubber (EPDM), while the other inner tube is based upon conventional rubber materials used in such hose types, such as CPE, EPDM, polychloroprene, SBR, natural rubber etc.

Figure 5:
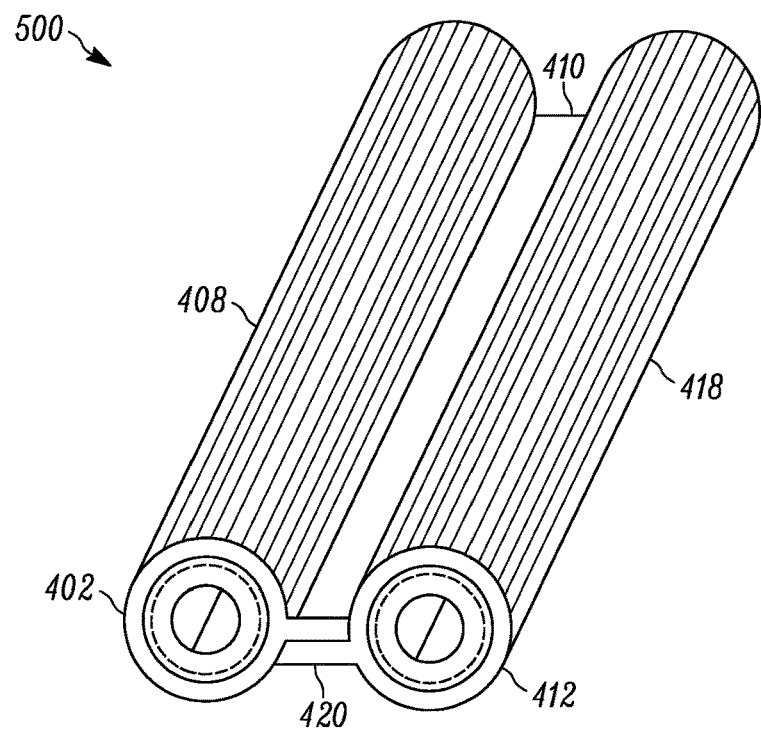
FIG. 5 depicts in a perspective view, a portion of another hose assembly embodiment, according to another aspect of the disclosure; and, FIG. 6 shows in a perspective view, a portion of yet another hose assembly embodiment, according to an aspect of the disclosure.

FIG. 5 shows a hose assembly 500 which includes hoses 402 and 412 attached with one another via tabs 410 and 420 extending from covers 408 and 418 respectively. Tabs 410 and 420 are attached with one another by any suitable means, including, but not limited to, applying an adhesive to the corresponding faces of the tabs, cohesively bonding the corresponding faces of the tabs during the hose curing process, combination thereof, and the like.

Figure 6:
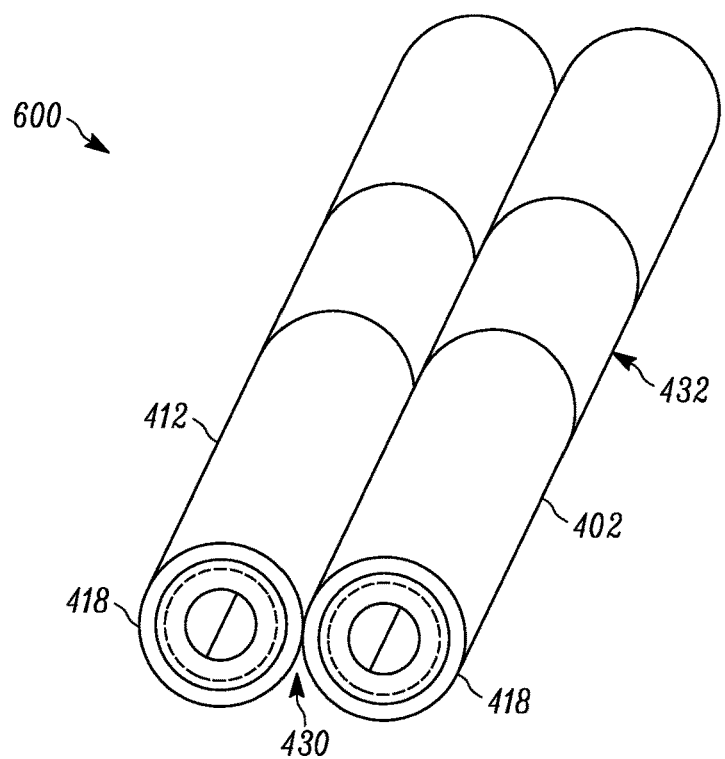

FIG. 6 depicts a hose assembly 600 which includes hoses 402 and 412 attached with one another via joint 430 formed from covers 408 and 418, and one or more clamps 432 (only one shown). Joint 430 may be securely constructed by any suitable means, including, but not limited to, applying an adhesive to the corresponding faces of the tabs, cohesively bonding the corresponding faces of the tabs during the hose curing process, combination thereof, and the like.

EXAMPLES

The following experimental data was generated for the purpose of further illustrating the nature of some of the embodiments and aspects of the disclosure, and are not intended as a limitation on the scope thereof. The following examples were prepared to illustrate that embodiments of the disclosure meet requirements of the AS-1335 standard. In the following examples, the blends of materials were prepared and passed through a Banbury® mixer in a single pass. It is within the scope of the disclosure that the blends could have been prepared in a twin pass process where a nonproductive blend is first prepared and passed through a Banbury® mixer, followed by adding the curative materials, and then passing through the Banbury® mixer to provide a productive mixture. All numerical values provided in Table 1 are expressed in unit of PHR (per hundred resin)

TABLE 1

| Trade Name | Chemical Name | Ex. 1 | Ex. 2 | Ex. 3 | Ex. 4 | Ex. 5 | Ex. 6 |
| --- | --- | --- | --- | --- | --- | --- | --- |
| Huber Carb Q325 | CaCO3 | 56 | 56 | 56 | 56 | 56 | 56 |
| N650 Carbon Black | Carbon black | 60 | 45 | 75 | 75 | 75 | 45 |
| Plasthall TOTM | Trioctyl Trimellite | 17 | 17 | 17 | 17 | 17 | 17 |
| Di Octyl Adipate | Di-2-Ethylhexladipate | 7 | 7 | 7 | 7 | 7 | 7 |
| Magnesium Oxide | Magnesium Oxide | 12 | 12 | 12 | 12 | 12 | 12 |
| CPE7130 | Chlorinated Polyethylene | 92 | 92 | 92 | 92 | 92 | 92 |
| Royalene 563 | 64/40 75M 4.7 ENB EPDM | 8 | 8 | 8 | 8 | 8 | 8 |
| TMQ | Quinoline, 1,2-dihydro-2,2,4-trimethyl-, homopolymer | 0.2 | 0.2 | 0.2 | 0.2 | 0.2 | 0.2 |
| Micral 632 | Hydrated Alumina | 10 | 10 | 10 | 10 | 10 | 10 |
| Akrosperse E-29072 (90% Antimony Oxide) | Antimony Oxide | 4 | 4 | 4 | 4 | 4 | 4 |
| Plasthall RP-1020 | Reactive Ester | 0 | 0 | 0 | 10 | 20 | 0 |

TABLE 1-continued

| Trade Name | Chemical Name | Ex. 1 | Ex. 2 | Ex. 3 | Ex. 4 | Ex. 5 | Ex. 6 |
|---|---|---|---|---|---|---|---|
| TAC/DLC-A Peroxide Coagent | Triallyl Cyanurate on Calcium Silicate | 2.5 | 2.5 | 1.5 | 2.5 | 2.5 | 2.5 |
| Plasthall RP-1020 | Dicumyl Peroxide | 5.25 | 5.25 | 3.75 | 5.25 | 5.25 | 5.25 |

Inner tubes were formed from the compounds presented in Table 1, above. The inner tubes were extruding into proper shape and sized, and then cured to for test samples. The inner tubes were subjected to the testing criteria for Australian Standard AS1335. Acetone resistance was conducted by exposing the test sample for 24 hrs @ 23 deg. C. to acetone, and mass weight changed measured. Change in international rubber hardness degree scale (IRHD) was also measured after 24 hours of acetone exposure. These test samples were also subjected to 2 minutes pressure testing @ 102 psi after 24 hours of acetone exposure. The same tests were conducted on samples after 24 hours of exposure to a 70% methyl borate/30% methanol blend, by volume, @ 23 deg. C.; however, volume change was measured instead of mass change.

Pentane resistance testing was conducted on the tube only. A portion of the tube was weighed ($m_0$) and then immersed in liquid pentane for 72 hrs at a temperature of 23 deg. C. The tube was then removed from the pentane, allowed to stand for 60 seconds, and then weighed ($m_1$). The tube was allowed to stand for 24 hours at 23 deg. C., and then weighed ($m_2$). Percent (%) pentane absorbed was calculated using the following formula:

$$\% \text{ pentane absorbed} = \frac{m_1 - m_2}{m_0} \times 100 \quad (A)$$

Percent (%) extractables was calculated using the following formula:

$$\% \text{ extractables} = \frac{m_0 - m_2}{m_0} \times 100 \quad (B)$$

Flammability testing was conducted on the test samples when incorporated into hoses, in accordance with testing procedure AS1335 Appendix B. Flame propagation had to be less than 50 mm from each side of center, and not penetrate through the hose wall.

TABLE 2

| IMMERSION TEST | Spec. Limit | Ex. 1 | Ex. 2 | Ex. 3 | Ex. 4 | Ex. 5 | Ex. 6 |
|---|---|---|---|---|---|---|---|
| Acetone Resistance | | | | | | | |
| IRHD chg. @ 24 hrs. | +/−5 pts. | 3 | 2 | 2 | 4 | 0 | 3 |
| Mass chg., maximum | +30% | 4 | 4 | 4 | 4 | 16 | 6 |
| Methyl Borate Resistance | | | | | | | |
| IRHD chg. @ 24 hrs. | +/−5 pts. | −3 | −3 | −4 | −2 | 0 | 4 |
| Volume chg., maximum | +30% | 13 | 14 | 12 | 12 | 16 | 18 |

TABLE 2-continued

| IMMERSION TEST | Spec. Limit | Ex. 1 | Ex. 2 | Ex. 3 | Ex. 4 | Ex. 5 | Ex. 6 |
|---|---|---|---|---|---|---|---|
| Pentane Resistance | | | | | | | |
| (A) % Absorbed, maximum | <15% | 6 | 6 | 5 | 7 | 9 | 8 |
| (B) % Extractables, maximum | <10% | 7 | 7 | 7 | 8 | 9 | 9 |
| Flame Test | Pass | Pass | Pass | Pass | Pass | Pass | Pass |

As shown in Table 2, inner tube samples evaluated met these requirements for Australian Standard AS1335.

The foregoing description of the embodiments and examples has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, and gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A hose comprising:
    a) an inner tube comprising a blend of chlorinated polyethylene (CPE) with ethylene propylene diene monomer rubber (EPDM), from 5 phr to 15 phr branched plasticizer, from 10 phr to 30 phr carbon black, from 30 phr to 60 phr mineral filling, and a peroxide curing agent, wherein the hose defines an inner conduit;
    b) a reinforcement layer disposed outwardly adjacent the inner tube; and,
    c) an outer cover disposed outwardly adjacent the reinforcement layer;
    wherein after curing, the inner tube at least meets methyl borate resistance, acetone resistance and pentane resistance requirements of Australian Standard AS1335.

2. The hose according to claim 1, wherein after curing, the inner tube exceeds the methyl borate resistance, acetone resistance and pentane resistance requirements of the Australian Standard AS1335.

3. The hose according to claim 1, wherein after curing, the hose at least meets flame resistance requirements of the Australian Standard AS1335.

4. The hose according to claim 1, wherein after curing, the hose comprises at least one of acetylene, oxygen, liquefied petroleum gases (LPGs), or mixtures of methylacetylene and propadiene (MPS), within the inner conduit.

5. The hose according to claim 1, wherein after curing, hose conveys at least one of acetylene, oxygen, liquefied petroleum gases (LPGs), or mixtures of methylacetylene and propadiene (MPS), through the inner conduit.

6. The hose according to claim 1, wherein the reinforcement layer comprises a plurality of spiral yarns.

7. The hose according to claim 1, wherein the outer cover comprises EPDM.

8. The hose according to claim 1, wherein the outer cover comprises CPE.

9. The hose according to claim 1, wherein the outer cover comprises CPE, EPDM, EPR, or any blends thereof.

10. The hose according to claim 1, wherein the blend of chlorinated polyethylene (CPE) with (EPDM) is in a weight ratio of from 5:1 to 20:1.

11. The hose according to claim 10, wherein the blend of chlorinated polyethylene (CPE) with (EPDM) is in a weight ratio of from 10:1 to 15:1.

12. A welding hose assembly comprising first and second hoses and couplings securely attached to opposing distal ends of each of the first and second hoses, wherein at least the first hose comprises:
    a) an inner tube comprising a blend of chlorinated polyethylene (CPE) with ethylene propylene diene monomer rubber (EPDM), from 5 phr to 15 phr branched plasticizer, from 10 phr to 30 phr carbon black, from 30 phr to 60 phr mineral filling, and a peroxide curing agent, wherein the hose defines an inner conduit;
    b) a reinforcement layer disposed outwardly adjacent the inner tube; and,
    c) an outer cover disposed outwardly adjacent the reinforcement layer; and,
    wherein after curing, the inner tube at least meets methyl borate resistance, acetone resistance and pentane resistance requirements of Australian Standard AS1335.

13. The welding hose assembly according to claim 12, wherein the first and second hoses comprise inner tubes constructed of the same composition.

14. The welding hose assembly according to claim 12, wherein the second hose comprises an inner tube constructed of an EPDM material.

15. The welding hose assembly according to claim 12, wherein after curing, the inner tube of the at least the first hose exceeds the methyl borate resistance, acetone resistance and pentane resistance requirements of the Australian Standard AS1335.

16. The welding hose assembly according to claim 12, wherein after curing, the first and second hoses at least meet flame resistance requirements of the Australian Standard AS1335.

17. The welding hose assembly according to claim 12, wherein the first and second hoses are attached by mating corresponding tabs extending from the outer cover of the first hose and an outer cover of the second hose.

18. The welding hose assembly according to claim 12, wherein the first and second hoses are attached by a joint formed from the outer cover of the first hose and an outer cover of the second hose.

19. The welding hose assembly according to claim 18, wherein the joint is cohesive and formed during the hose curing process.

20. The welding hose assembly according to claim 18, wherein the joint is formed during by applying an adhesive to the outer cover of the first hose and the outer cover of the second hose.

21. The welding hose assembly according to claim 18, wherein the first and second hoses are further attached by a clamp.

* * * * *